UNITED STATES PATENT OFFICE.

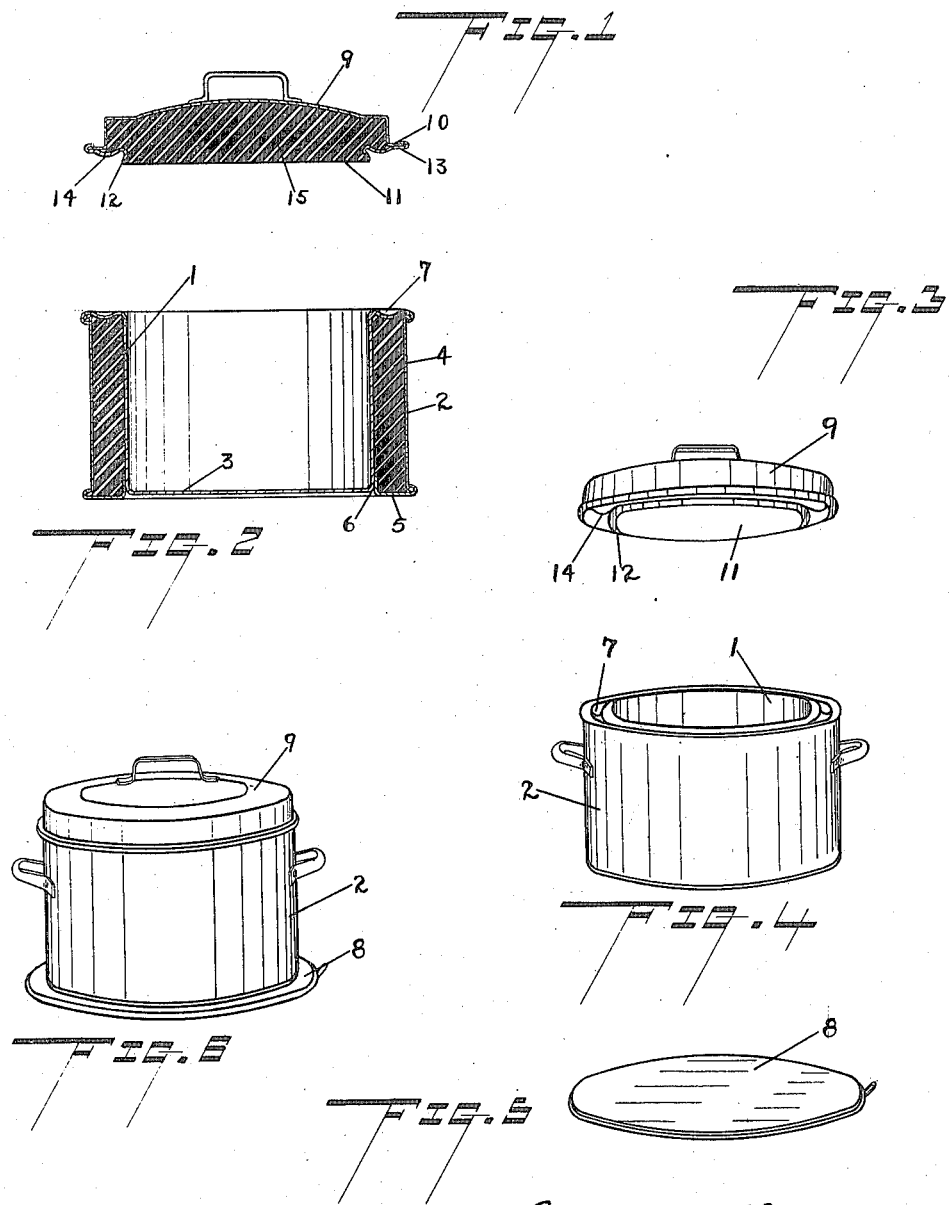

EDGERTON K. LINTON, OF SAGINAW, MICHIGAN.

COOKING UTENSIL.

1,157,991.  Specification of Letters Patent.  Patented Oct. 26, 1915.

Application filed July 7, 1913. Serial No. 777,702.

*To all whom it may concern:*

Be it known that I, EDGERTON K. LINTON, a citizen of the United States, residing at Saginaw, in the county of Saginaw and State of Michigan, have invented certain new and useful Improvements in Cooking Utensils; and I do hereby declare the following to be a full, clear, and exact description of the invention, such as will enable others skilled in the art to which it appertains to make and use the same.

This invention is a cooking utensil and relates more particularly to insulated cooking pails in which a food-containing vessel is employed having an insulated jacket surrounding its shell and provided with an insulated cover, the bottom of the vessel being uninsulated and adapted to be set upon an independent base which is insulated, after the contents of the vessel has been sufficiently heated.

The improvement relates more particularly to the construction of such a cooker whereby the bottom of the vessel is separated from the insulated base by a dead air space when the vessel is resting on the base. Means is also provided whereby wear on the bottom of the vessel is avoided and the vessel is so supported that warping of its bottom by heat will not allow the heat to escape while the vessel is resting on the base.

Conductivity of heat from the vessel's contents to the outer jacket is also reduced by providing a bottom rim of low conductivity that connects the vessel to the jacket.

I also provide a water seal between the cover and the upper edge of the vessel, the seal being formed by means of a flange integral with the walls of the vessel. The arrangement of parts is such that the labor and material required are reduced to a minimum and an efficient cooking vessel can be produced at a low cost.

With these and certain other objects in view which will appear later in the specification, my invention consists in the devices described and claimed and the equivalents thereof.

In the drawings, Figure 1 is a vertical section through the cover of the vessel; Fig. 2 is a similar section through the vessel; Figs. 3 and 4 are respectively perspective views of the cover and the vessel; Fig. 5 is a perspective view of the insulated base; and Fig. 6 is a perspective view of the vessel resting on the base, with the cover in place.

As is clearly shown in the drawings, the device consists of a food-containing vessel 1 surrounded by a shell of cylindrical or other suitable form 2, the bottom of which projects slightly below the bottom 3 of the vessel.

The space between the shell and the vessel is preferably filled with insulating material 4. An annular ring 5 preferably of some substance which is not a good conductor of heat, is secured at its outer edge to the bottom of the shell 2 and has its inner edge formed with an upwardly projecting flange 6 which is secured to the vessel 1 near its bottom. A suitable substance is the metal commonly known as "Monel metal," which has a heat conductivity of about one-fifteenth of that of pure copper. The annular ring 5 projects slightly below the bottom 3 of the vessel for purposes which will presently be described.

The upper edge of the shell is provided with an outwardly extending ring or flange and the outer periphery of the flange is secured to the upper edge of the shell 2.

The flange is depressed to form a shallow groove 7 to receive a corresponding bead of the cover and to serve as a water seal when a small amount of steam produced by evaporation in the vessel condenses in the groove.

8 is a flat base of any insulating material, as an asbestos mat or pad, upon which the vessel rests after it has been heated on a stove or otherwise.

It will be noted that the annular ring 5, a part of which projects below the bottom of the vessel 3, leaves a shallow clearance or dead air space between the bottom of the vessel and the pad, thus greatly increasing the heat insulating efficiency of the base and reducing the rate of cooling of the contents of the vessel.

It has been found in practice that when the vessel is heated the bottom is likely to warp or buckle slightly. The clearance space between the bottom of the vessel and the mat on which the ring 5 rests enables the ring to maintain close contact with the mat and preserves the heat insulating efficiency of the pad.

The cover is preferably formed of a sheet of metal 9 having its edge flanged downwardly and outwardly as at 10. The bottom sheet of the cover is formed with a downwardly projecting cylindrical central part 11, that part of the sheet at the edges of the central part 11 being pressed upwardly and inwardly as at 12, the remainder of the sheet forming an outwardly extending flange 13. This flange is formed with a shallow downwardly projecting bead 14 of the same shape as the circular groove 7 and adapted to fit therein. The shoulder formed by the edge 12 fits snugly within the vessel 1. The space between the top and bottom sheets of the cover is filled with any suitable non-conducting material 15.

When the cover is in place and evaporation has commenced in the vessel, a small amount of steam will penetrate between the downwardly projecting bead 14 of the cover and the shallow circular groove 7 of the vessel 1 and this steam condensing will form a water seal that will prevent further escape of the vapor until considerable steam pressure has been generated in the vessel and then the cover will be free to lift, relieving the pressure. When the vessel has been removed from the stove and is placed on the insulating base and a slight degree of condensation has taken place in the vessel, the cover will be tightly held in place by atmospheric pressure, it being found in practice that it is possible at such times to lift the vessel with its contents by means of the cover although the cover has no mechanical fastening means.

The vapor that forms the water seal does not come into contact with the base 8 and, therefore, there is no liability of injuring the base by getting it wet.

It will thus be seen that the cover will automatically relieve any excess of steam pressure that may be generated in the vessel, yet will prevent air from entering the vessel when condensation commences and the cover at that time will be held as tightly in place as if it were clamped by mechanical means, which is an important consideration in the design of cooking utensils of this type.

Having described my invention, what I claim and desire to secure by Letters Patent is:

The combination with a containing vessel closed at the lower end and open at the upper end and having an outwardly projecting flange formed at the top edge thereof; of a cylindrical shell having its upper edge secured to the outer edge of said flange; an annular ring of low heat conductivity arranged below the bottom of said vessel and secured at its outer edge to the lower edge of said shell, the inner edge of said ring being formed with an upwardly projecting flange, which flange is secured to the lower edge of said vessel and an insulated double wall cover for closing the open end of said vessel.

In testimony whereof, I affix my signature in presence of two witnesses.

EDGERTON K. LINTON.

Witnesses:
  JOSEPH V. CARPENTER,
  GEO. B. WILLCOX.